Sept. 23, 1969   J. G. ASHBY ET AL   3,468,553
TOOL RETAINING DEVICES

Filed Jan. 30, 1967   2 Sheets-Sheet 1

JOHN GARDINER ASHBY
DENNIS SAMPSON BURRELL
INVENTORS

BY *Young & Thompson*
ATTORNEYS

Sept. 23, 1969　　　J. G. ASHBY ET AL　　　3,468,553
TOOL RETAINING DEVICES

Filed Jan. 30, 1967　　　　　　　　　　　　2 Sheets-Sheet 2

JOHN GARDINER ASHBY
DENNIS SAMPSON BURRELL
INVENTORS

BY Young + Thompson

ATTORNEYS

United States Patent Office 3,468,553
Patented Sept. 23, 1969

3,468,553
TOOL RETAINING DEVICES
John Gardiner Ashby, Totley, Sheffield, and Dennis Sampson Burrell, Bolsover, England, assignors to Matthias Spencer & Sons Limited, Sheffield, England
Filed Jan. 30, 1967, Ser. No. 612,507
Claims priority, application Great Britain, Jan. 31, 1966, 4,190/66
Int. Cl. B23b 31/10, 5/22, 5/34
U.S. Cl. 279—97                 10 Claims

ABSTRACT OF THE DISCLOSURE

A tool retaining device having a metal locking pin bonded in a groove of a resilient backing member. One end of the backing member is formed with an integral end sealing cap and the other end has a projecting spigot onto which a further end sealing cap is fitted when the device is fitted in a tool holder. In the fitted position, the two sealing caps respectively seal the ends of the device and thereby prevent the ingress of foreign matter.

---

Figure 1:
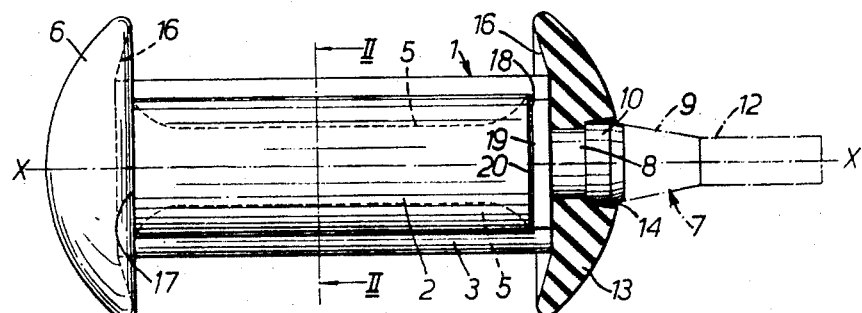

This invention relates to tool retaining devices and more particularly, though not exclusively, to pick retaining devices for use in mineral mining machinery, such as coal cutting machinery for example.

One of the requisites of a pick retaining device is that it should enable the pick to be inserted into and removed from a pick box with the minimum of effort, and hence time, in order to minimise the non-productive period of a machine whilst the picks are being renewed or inspected. There are many known devices which achieve this requirement but fail to achieve a second requirement which is that the device should be sealed against the ingress of foreign matter which otherwise enters the device and impairs the operation thereof and sometimes renders it inoperative.

Many quick release pick retaining devices utilise some form of resilient member which can be compressed to allow movement of a locking member on insertion or removal of a pick. However, the resilient member may cause breakdown of the sealing arrangement of the device in that when it is compressed there is some expansion in a direction generally at right angles to the direction of compression, this expansion being sufficient in some cases to dislodge sealing caps, for example.

It is the object of the present invention to provide a quick release tool retaining device which in use is adequately sealed at all times.

According to a first aspect of the invention a tool retaining device comprises a metal locking member and a resilient backing member therefor, and two end sealing caps respectively formed integrally with, fixed or attachable to the ends of the resilient member in order to seal the whole of each end of the device when the latter is fitted in a tool holder.

Preferably the end sealing caps are of a resilient material and only one is formed integrally with the corresponding end of the resilient backing member. The other end, or alternatively each end, of the resilient member may be formed with an integral spigot onto which the corresponding sealing cap is fitted when the device is in position in the tool holder. The spigot and corresponding end cap are conveniently shaped in such a way as to ensure the retention of the cap on the spigot during use and the spigot may be of a length to project beyond the end cap when fitted and hence facilitate the assembly thereon of the cap. After assembly, the spigot may then be cut off at a convenient point which may be just proud of the outer face of the end cap. Each spigot may be disposed centrally with respect to the entire unit and the associated end cap formed with a central aperture through which in use the spigot is threaded.

The end caps are preferably dished so that sealing surfaces of the caps lie flat against corresponding end faces of the tool holder and are then held in this position under slight tension. On compression of the resilient member on insertion and removal of the tool into and from the tool holder the expansion of the resilient member in a direction generally at right angles to the direction of compression may be such as to deform the end caps but this does not impair the end seals as the caps tend to return to their initial dished shape. In order to reduce the extent of said expansion, the resilient backing member may be grooved to form longitudinal flutes to accommodate the compression of that member in use of the device.

The locking member may be in the form of a metal pin and the resilient backing member may be in the form of a longitudinally grooved cylindrical block of rubber or other resilient material. The metal pin may be bonded in one of the longitudinal grooves. The end faces of the metal pin may also be bonded to the resilient member and a radial projection be formed on the latter for this purpose. In the case of an integral end cap the corresponding end face of the metal pin is bonded to the inner face of the cap.

The resilient backing member may be contained in a metal sheath which is formed with a window through which the locking member projects. The sheath is split to allow movement under compression of the resilient member and is preferably deformed at a point diametrically opposite to the window to provide a rib which serves to locate the device in the tool holder. In this arrangement the pin may not be bonded to the resilient member and may be formed with frusto-conical ends which seat in complementary portions of the resilient member which is suitably cut away to allow the member to be removably embedded therein.

According to a second aspect of the invention, there is provided a tool holder having a tool retaining device in accordance with the first aspect of the invention. The tool holder can be used with a variety of mining machinery such as coal cutter chains, disc shearers, both bucket and point-attack types, trepanning machines, continuous miners, heading machines, drums, augers and cones, and coring buckets. The latter are used for earth boring in preparation for concrete piles.

Figure 2:
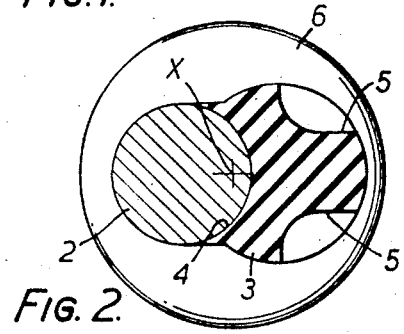
Figure 3:
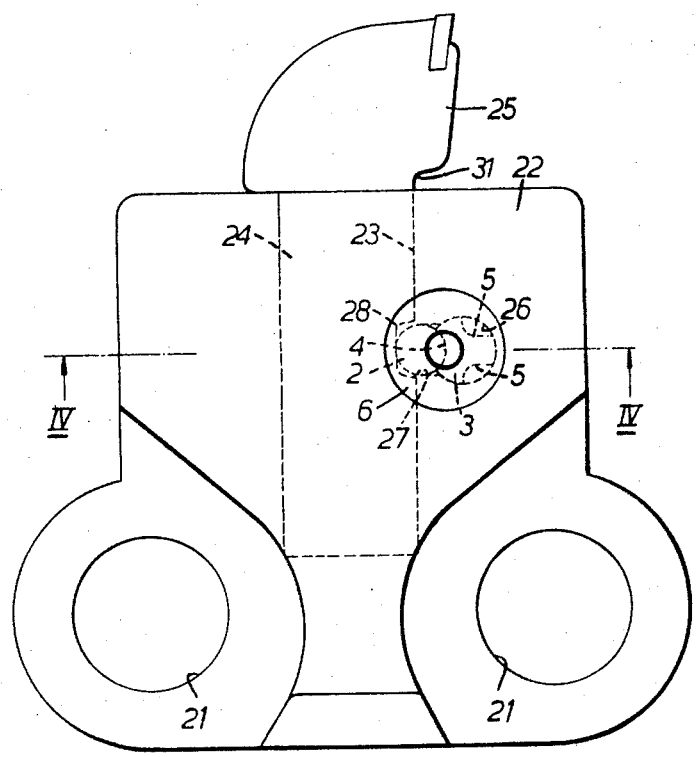
Figure 4:
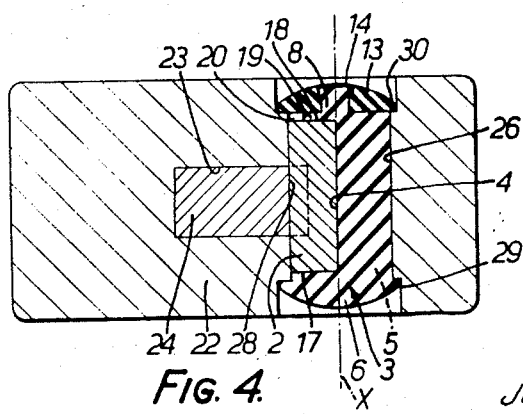

The invention will now be further described with reference to the accompanying drawings which show, by way of example, a tool retaining device in accordance with the invention and in association with a tool holder, together with three modifications of the tool retaining device. In the drawings:

FIGURE 1 is a side view, partly in axial section, showing the tool retaining device, FIGURE 2 is a sectional view on the line II—II of FIGURE 1, FIGURE 3 is an end view of the tool holder with the tool retaining device fitted therein, FIGURE 4 is a sectional view on the line IV—IV of FIGURE 3, and FIGURES 5 to 7 are scrap side views, partly in section, showing the first, second and third modifications, respectively.

Referring to FIGURES 1 and 2, the tool retaining device 1 comprises a locking member in the form of a cylindrical metal pin 2 bonded to a resilient backing member 3 composed of rubber. The resilient member 3 is of longitudinally grooved cylindrical form and a diameter greater than that of the metal pin 2 which is bonded to it in one part-cylindrical groove 4 formed in the surface of the resilient member 3 and extending parallel to the longitudinal axis X—X of the device 1. The axis X—X lies approximately midway between the separate longitudinal axes of the resilient member 3 and the pin 2, as shown in FIGURE 2. The resilient member 3 extends beyond each end of the metal pin 2 and two circumferentially spaced flutes 5 are formed therein as a result of the grooving to accommodate compression of the resilient member 3 in use.

An end sealing cap 6 is moulded integrally with one end of the resilient member 3, the cap 6 being disposed coaxially with respect to the axis X—X.

The other end of the resilient member 3 is formed with an integral spigot 7 which is also coaxial with the axis X—X. The spigot 7 has a neck portion 8 immediately adjacent the end of the resilient member 3 and then develops into an outwardly tapering frusto-conical portion 9 the base of which adjoins, and is of greater diameter than, the neck portion 8, and is cylindrical over a part of its length 10. The outer end of the frusto-conical portion 9 develops into a further cylindrical portion 12.

A separate rubber end cap 13 is provided and is generally similar to the integral cap 6, but has a central aperture 14 through which the spigot 7 of the resilient member 3 is threaded on assembly of the end cap 13. The aperture 14 in the separate end cap 13 is stepped so that the outer end thereof is of greater diameter than the inner end and substantially equal to the diameter of the cylindrical part 10 of the base of the frusto-conical portion 9 of the spigot 7. The diameter of the inner end of the aperture is substantially equal to the neck portion 8 of the spigot 7. Thus the cap 13 is a snap fit on the spigot 7 and is retained thereon, this condition being shown in FIGURE 1. Both the end sealing caps 6 and 13 have dished sealing surfaces 16 (FIGURE 1).

The metal pin 2 has its end faces 17 and 18 bonded to the resilient member 3, one face 17 being bonded to the underside of the integral end cap 6 and the other face 18 bonded to a radially extending projection 19 formed at the other end of the resilient member 3. The projection 19 terminates at a position just beyond the longitudinal axis of the metal pin 2 and the portion of the end face 18 of the latter which would otherwise be exposed is bonded to a thin web of rubber 20 (FIGURES 1 and 4) formed integrally with the body of the resilient member 3.

The device 1 is designed to retain a coal cutting pick in a tool holder a typical form of which is shown in FIGURE 3. The tool holder is in the form of a pick box 22 which is formed with a socket 23 of rectangular cross-section to receive a similarly shaped shank 24 of the pick which is designated 25 in FIGURE 3. A transverse bore in the pick box 22 intersects the socket 23, the bore comprising a main part-cylindrical section 26 and a minor section 27 which is parallel to and offset with respect to the section 26. The pick shank 24 has a groove 28 formed in one face thereof. The pick box 22 is adapted to be used with a coal cutting chain and has two apertures 21 which are connected to laterally spaced links of the chain.

In use the device is inserted into the bore in the pick box 22 with the resilient member 3 fitting closely in the section 26 and the metal pin 2 fitting closely in the section 27. Thus part of the pin 2 projects into the socket 23 and is arranged to engage the groove 28 in the pick shank 24.

When the device 1 is in position in the pick box 22 the integral end sealing cap 6 is deformed from its dished shape and it lies flat against the corresponding face 29 providing a shoulder which defines the transition between the corresponding end of the sections 26 and 27 and a circular counterbore, this being shown in FIGURE 4. The spigot 7 at the other end of the resilient member 3 projects from the pick box 22 and the separate end sealing cap 13 is assembled thereon by threading it over the spigot 7 and snapping it in position so that the neck 8 of the spigot 7 engages the portion of the smaller diameter of the aperture 14 in the end cap 13. The spigot 7 is then cut off about 0.125 inch from the outer face of the end cap 13, this cap 13 also being deformed to lie flat against the corresponding face 30 providing a shoulder which defines the transition between the corresponding end of the sections 26 and 27 and a further circular counterbore. A special tool (not shown) may be provided for assembling the separate end sealing cap 13 on the spigot 7.

On insertion of the pick 25 into the pick box 22 the shank 24 of the pick 25 engages the part of the metal pin 2 projecting into the socket 23 and depresses it into the bore against the action of the resilient member 3 which is thus compressed. This compression is accommodated for the most part by the two flutes 5 formed for this purpose in the resilient member 3 but there may nevertheless be a slight resultant axial expansion of the resilient member 3. This expansion may result in the displacement of the centres of the end caps 6 and 13 but as the caps are under slight tension they will merely tend to take up their basic dished shape whereby the seal with the corresponding faces 29 and 30 of the pick box 22 is maintained. Ingress of foreign matter to the device 1 is prevented at all times or at least to an extent which does not impair the operation of the device.

The pick 25 is removed from the box 22 by engaging an extractor (not shown) with a slot 31 formed in the pick 25 and using the box 22 as a fulcrum. The resilient member 3 is compressed by the levering action until the inner end of the shank 24 clears the pin 2 whereupon the pick 25 may be withdrawn from the box 22.

Figure 5:
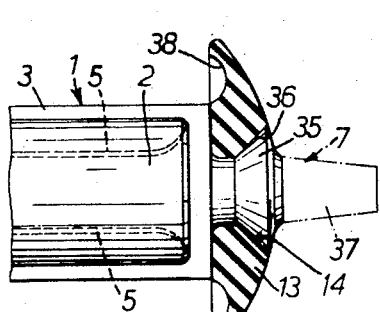
Figure 6:
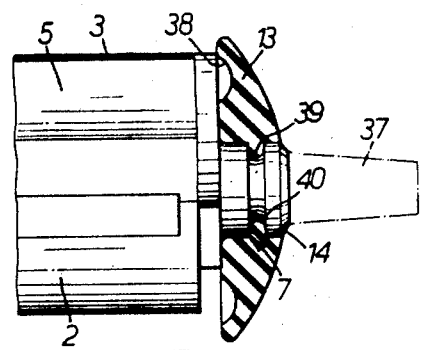
Figure 7:
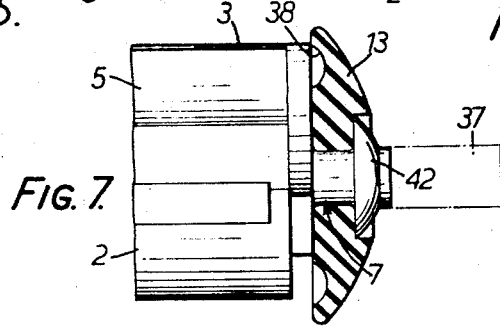

The modified forms of retaining devices are generally similar to that already described and FIGURES 5 to 7 accordingly show these devices mainly insofar as they differ from the construction shown in FIGURES 1 to 4.

In the first modification shown in FIGURE 5, the spigot 7 is formed with an outwardly divergent frusto-conical portion 35 the sloping faces of which engage a countersunk bore 36 in the outer end of the aperture 14 in the end cap 13. After fitting, a tapering portion 37 moulded integrally with the remainder of the spigot 7 is cut away just proud of the outer end of the cap 13. The sealing cap 13 (and also the integrally formed cap 6 which is not shown), instead of being dished, has a circumferential flexing groove 38 to maintain the sealing action with the end face 30 of the pick box 22.

The second modification (FIGURE 6) has a spigot 7 with a circumferential recess 39 into which fits a complementary annular rib 40 formed in the aperture 14 of the end cap 13. Alternatively, the rib may be formed on the spigot 7 and the recess in the aperture 14 of the cap 13. The spigot 7 of the third modification (FIGURE 7) has a mushroom head portion 42 which seats in a countersunk bore in the cap 13. Each of the second and third modifications has a cap 13 with a flexing groove 38 and in each case the spigot 7 has a portion 37 which is cut away after the device 1 is fitted in the pick box 22.

The portion of the spigot 7 which engages the sealing cap 13 may alternatively be harpoon or spade-shaped, the aperture 14 in the sealing cap 13 then being shaped accordingly. If desired the spigots may be disposed coaxially with respect to the resilient member 3 as opposed to centrally of the whole end of the device.

When the resilient member 3 is being compressed during insertion or removal of the pick 25 from the box 22 there is a tendency for the pin 2 to distort the integral sealing cap 6 which then fails to make sealing engagement with the face 19 of the box. In order to overcome this tendency the bonding between the end of the pin and the sealing cap 6 may be broken.

We claim:
1. A device for retaining a tool in a tool holder and comprising an elongated metal locking member, a resilient backing member attached to the locking member along one longitudinally extending side of the latter and two end sealing caps respectively dimensioned to completely overlap and project laterally of the two ends of the lock- ing and resilient members which together have a non-circular shape in transverse cross-section for fitting within a cross-bore of generally complementary shape in the tool holder, the two end caps in use providing longitudinal location for the locking and resilient members within the cross-bore and respectively sealing the ends of the cross-bore by overlapping the tool holder around the ends of the cross-bore.

2. A device according to claim 1, wherein the end sealing caps are of a resilient material.

3. A device according to claim 2, wherein one of the sealing caps is formed integrally with the corresponding end of the resilient backing member and the other sealing cap is attachable during fitting of the revice with the locking and resilient members in position in the tool holder.

4. A device according to claim 3, wherein the other end of the resilient member is formed with a projecting spigot onto which the corresponding sealing cap can be fitted.

5. A device according to claim 1, wherein the sealing caps are dished so that, on initial assembly of the device in the tool holder, sealing surfaces of the caps lie flat against corresponding end faces of the tool holder and are held in this position with a resilient sealing action.

6. A device according to claim 1, wherein the resilient backing member is formed with longitudinal flutes to accommodate the compression of that member in use of the device.

7. A tool retaining device according to claim 1, wherein the locking member is in the form of a cylindrical metal pin bonded within a longitudinally extending groove in the resilient backing member which is generally part-cylindrical.

8. A tool holder having a socket for the reception of a tool shank and a cross-bore which intersects the socket and in which a tool retaining device is adapted to be fitted, the cross-bore being of non-circular shape in cross-section in order to prevent the device, which is of complementary shape, from turning within the cross-bore which has a major part-cylindrical section and a minor part-cylindrical section of smaller radius, the two sections breaking into one another and the longitudinal axis of the minor section being offset laterally and towards the socket from the longitudinal aris of the major section.

9. A tool holder according to claim 8, wherein each end of the cross-bore is counterbored to provide a shoulder which completely surrounds the end of the cross-bore and against which a corresponding one of two sealing caps of the device is intended to engage.

10. A tool holder having a socket for the reception of a tool shank and a cross-bore which intersects the socket and in which a tool retaining device is fitted, the device having an elongated metal locking member a portion of which projects into the socket for engagement with the tool shank to retain the latter, a resilient backing member attached to the locking member along one longitudinally extending side of the latter and two end sealing caps respectively completely overlapping and projecting laterally of the two ends of the cross-bore which has a non-circular shape in transverse cross-section and is complementary to the cross-sectional shape of the locking and resilient members, the two end caps providing longitudinal location for the locking and resilient members within the cross-bore and respectively sealing the ends of the cross-bore by overlapping the tool holder around the ends of the cross-bore.

References Cited

UNITED STATES PATENTS

| 3,009,381 | 11/1961 | Rapato | 85—7 |
| 3,088,721 | 5/1963 | Krekeler | 299—92 |
| 3,193,895 | 7/1965 | Oxley | 24—73 |

ROBERT C. RIORDON, Primary Examiner

D. MELTON, Assistant Examiner

U.S. Cl. X.R.

299—92